(12) United States Patent
Slatter et al.

(10) Patent No.: US 7,114,283 B2
(45) Date of Patent: Oct. 3, 2006

(54) ADJUSTABLE ARM ASSEMBLY

(75) Inventors: Stephen O. Slatter, Sunrise, FL (US); William E. Kushner, Miami, FL (US); Jon E. Kushner, Miami, FL (US)

(73) Assignee: Taco Metals, Inc., Miami, FL (US)

( * ) Notice: Subject to any disclaimer, the term of this patent is extended or adjusted under 35 U.S.C. 154(b) by 0 days.

(21) Appl. No.: 10/852,525

(22) Filed: May 24, 2004

(65) Prior Publication Data

US 2004/0244268 A1    Dec. 9, 2004

Related U.S. Application Data

(60) Provisional application No. 60/473,309, filed on May 23, 2003.

(51) Int. Cl.
*A01K 91/18* (2006.01)
(52) U.S. Cl. ..................... 43/27.4
(58) Field of Classification Search .......... 43/27.4; 254/8 R; 212/180
See application file for complete search history.

(56) References Cited

U.S. PATENT DOCUMENTS

| | | | | |
|---|---|---|---|---|
| 3,724,791 A | * | 4/1973 | Mason | 248/514 |
| 5,445,102 A | * | 8/1995 | Rupp | 114/255 |
| 5,690,240 A | * | 11/1997 | Thiermann, Sr. | 212/180 |
| 6,612,548 B1 | * | 9/2003 | Landreth et al. | 254/8 R |

* cited by examiner

*Primary Examiner*—Michael J. Carone
*Assistant Examiner*—Bret Hayes
(74) *Attorney, Agent, or Firm*—Robert M. Scwartz; Alfred K. Dassler

(57) ABSTRACT

An adjustable arm assembly for use with an outrigger is disclosed that includes a rotating arm tube secured to a lower head, an upper pivoting head operatively engaged to the lower head and an operating barrel, and a crank assembly operatively engaged to the operating barrel and secured to the rotating arm tube. Additionally, the adjustable arm assembly further includes a threaded operating shaft in rotational engagement with the crank assembly, the threaded operating shaft engaging adjustment threads of the operating barrel, and a position indicator tube having a position indicator connected to the operating barrel.

15 Claims, 21 Drawing Sheets

ADJUSTABLE ARM ASSEMBLY

CROSS-REFERENCES TO RELATED APPLICATION

This application claims the benefit of U.S. Provisional Application Ser. No. 60/473,309, filed on May 23, 2003, entitled ADJUSTABLE ARM ASSEMBLY.

FIELD OF THE INVENTION

This invention relates to the field of sport fishing, and particularly to an outrigger mounting system having a outrigger mounting arm assembly that is vertically adjustable through a crank system and capable of rotational movement.

BACKGROUND OF THE INVENTION

Saltwater sport fishing typically consists of anglers positioned on boats that are then dispatched to prolific offshore fishing areas. One useful method of catching game fish involves a technique known as trolling. Trolling is the practice of baiting hooks that are subsequently lowered and dragged behind the stern of a slow moving vessel by the angler. In order to increase the chances of hooking a fish, it is beneficial to have as many lines in the water as possible. To a game fish, the wake of a vessel generally creates the appearance of a large school of smaller fish to be preyed upon. The angler can strategically simulate bands of straggling or displaced fish from the school with numerous baited lines. These simulated straggling fish are misinterpreted to be the disadvantaged and weakened fish that game fish frequently utilize as a food source.

As stated above, an angler will often drag as many baited lines from behind the boat as possible, thereby increasing the chances of hooking a fish. However, as more baited lines are used, the probability of the lines becoming entangled with one another increases. This is a problem that occurs in a variety of situations, such as with a narrow beam boat or any boat that is in the process of being turned. As a result, sport fishing outriggers have been developed to assist in keeping the various lines separated. However, the positioning and lowering of outrigger booms presents additional problems of rotational movement and preventing the booms from contacting the water. This problem has brought forth various attempts to create mechanisms to rotate the boom and that prevent the boom from contacting the water.

Outriggers consist of a long pole, or boom, having one end secured to the boat with deployment resulting from an outward lateral extension of the boom from a side of the boat. Baited fishing lines often have integrated release clips that are attached to the outriggers, thereby providing sufficient separation between the lines to prevent tangling. When a fish is hooked on the bait line, the line clip releases from the outrigger, thus allowing the angler to reel in the fish.

Outriggers are required to be freely stowable to a position beside the boat for close quarters operation and docking. For practicality, the outrigger should be swung laterally outward to its deployed position. The prior art includes various types of mounting schemes including outrigger units for horizontal and vertical mounting, on center consoles, flybridges, half towers, tuna towers, radar arches, and/or T-tops. Prior patents disclose a variety of methods for mounting, deploying, and locking such outriggers into place (see e.g. U.S. Pat. Nos. 5,445,102 and 3,724,791), with each having distinct drawbacks. Such drawbacks include overall mechanical complexity; powered operation; non-durable construction; and/or ineffective position adjustment and locking mechanisms that slip and/or wear out.

Although the prior art discloses a vast array of mechanisms and mounting locations for outrigger mounts, the prior art fails to disclose or otherwise teach a simple and durable outrigger system having an effective positionable arm that allows for both vertical and rotational movement of the boom attachment arm tube, with the vertical movement provided by a cranking system. This is of particular importance with respect to the excessive forces experienced by an outrigger mount during operation. Both wind and movement (of the boat) impart forces on to a boom, thereby increasing the stresses on the outrigger mount of the boom. Generally, the longer the boom, the greater the stresses at the outrigger mount. If the crank system/position adjustment and associated mechanisms were to succumb to these increases in stress, the outrigger might swing in an unrestricted manner during a critical maneuver or operation, with potentially disastrous or life-threatening results to passengers of the outrigger equipped boat or other surrounding vessels. Accordingly, an outrigger assembly with a novel position adjustment and locking mechanism is disclosed that alleviates this and other shortcomings of the prior art.

As described in the aforementioned prior art, the mounting and operation of a conventional outrigger system can be complicated. Booms of considerable length must be stored in an upright position to allow the vessel to pass beneath low bridges, as well as for close quarters maneuvering.

Similarly, should the boat pass under or through an object that limits clearance, the boom must be vertically lowered and/or rotated in from the extended position on a non-vertical plane. Preferably the outrigger mount not only rotates in the non-vertical plane in a 360° arrangement from a position on the vessel, but also allows the boom attachment arm to be easily raised and lowered in a vertical plane. Thus, in the operation of a one way of several conventional outrigger booms, the boom is inserted into a vertically adjustable boom attachment arm, usually as part of an elbow, and locked into position with a locking pull pin. The outrigger boom is then rotated in a non-vertical plane to a point determined by the user. Additionally, either before or after the boom is rotated in the non-vertical plane, the user may raise or lower the boom within a vertical plane with respect to the outrigger mount.

Accordingly, what is lacking is an outrigger assembly having an effective positionable arm that allows for both vertical and rotational movement of the boom attachment tube, with the vertical movement provided by a cranking system, to eliminate the complicated and problematic outrigger mounts commonly used to support outrigger booms.

SUMMARY OF THE INVENTION

The present invention eliminates the above-mentioned needs for an outrigger assembly by providing an outrigger assembly having a positionable arm that allows for both vertical and rotational movement of the boom attachment tube, with the vertical movement provided by a cranking system.

In accordance with the present invention, there is provided an adjustable arm assembly for use with an outrigger. The adjustable arm assembly includes a rotating arm tube secured to a lower head, an upper pivoting head operatively engaged to the lower head and an operating barrel, and a crank assembly operatively engaged to the operating barrel and secured to the rotating arm tube.

Additionally, the adjustable arm assembly further includes a threaded operating shaft in rotational engagement with the crank assembly, the threaded operating shaft engaging adjustment threads of the operating barrel, and a position indicator tube having a position indicator connected to the operating barrel.

The present invention further provides a method for adjusting an arm assembly, including rotating a crank handle of a crank assembly positioned below a position indicator to arrange a boom attachment arm tube in a first position relative to the crank handle, engaging a lever to permit rotation of the boom attachment arm into a second position, rotating the boom attachment arm into the second position, and disengaging the lever to restrict rotation of the boom attachment arm out of the second position.

BRIEF DESCRIPTION OF THE FIGURES

FIG. 8b is partially sectioned isometric view of the alternative embodiment of the rotator and crank assembly of the FIG. 8a.

FIG. 9b is an exploded, partially sectioned isometric view of the alternative rotator and crank assembly of FIG. 9a.

DETAILED DESCRIPTION OF THE INVENTION

Figure 1:
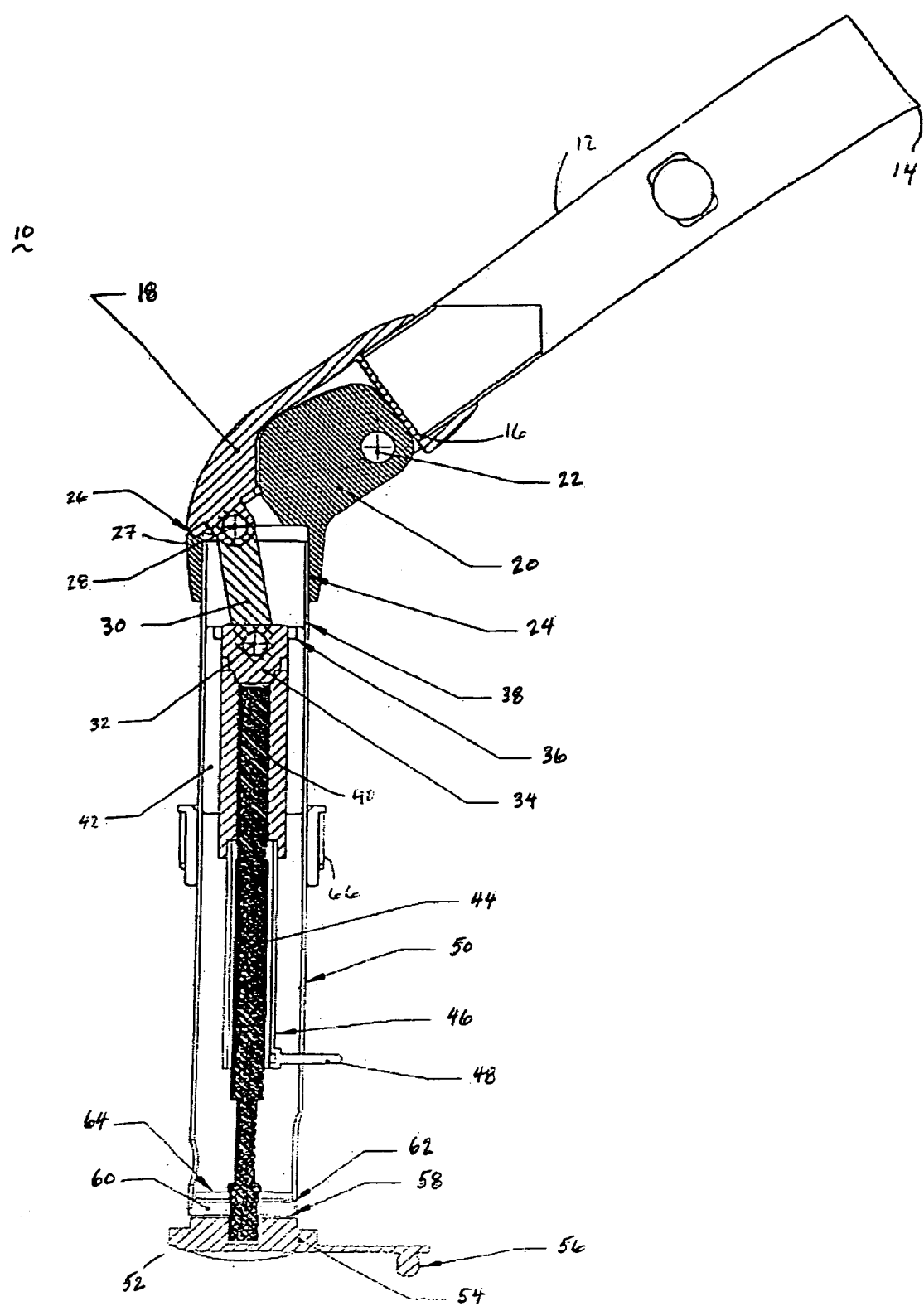
FIG. 1 is a sectioned side view illustration of the present invention.

Referring now to FIG. 1, an embodiment of the present invention is illustrated as adjustable arm assembly 10. Adjustable arm assembly 10 includes boom attachment arm tube 12, an upper pivoting head 18 fixedly engaged to boom attachment arm tube 12, a lower head operatively engaged to upper pivoting head 18, and an operating barrel 34 operatively engaged to upper pivoting head 18 and a crank assembly 52.

In the preferred embodiment of the present invention, boom attachment arm tube 12 has a distal end 14 that is capable of receiving an outrigger boom. Boom attachment arm tube 12 is received by and fixedly attached to upper pivoting head 18 at a proximal end 16. Boom attachment arm tube 12 is further capable of securing the outrigger boom.

Upper pivoting head 18 is operatively engaged to lower head 20, preferably by head fulcrum point 22. A lower head cushion 26 is positioned between upper pivoting head 18 and lower head 20, so as to reduce wear and impact forces between upper pivoting head 18 and lower head 20. Lower head 20 incorporates a head stop 27 to prevent over-travel of upper pivoting head 18 (discussed in further detail below). Lower head is formed so as to accommodate rotating arm tube 24.

Rotating arm tube 24 at least partially encloses operating barrel 34, which is operatively engaged to upper pivoting head 18. Operating barrel 34 is preferably operatively engaged to upper pivoting head 18 by an operating link 30 that is connected to upper pivoting head 18 by link fulcrum point 28 and further connected to operating barrel 34 by link fulcrum point 32.

Operating barrel 34 further incorporates threading for a threading engagement to operating shaft 44, as is detailed below. Operating barrel 34 is housed in a barrel guide sleeve 42, which incorporates a barrel seal 36 that permits passage of operating barrel 34 there through while inhibiting or preventing the passage of undesirable materials, such as water.

Barrel sleeve guide 42 is preferably affixed to an internal portion of rotating arm tube 24, most preferably below a drainage/venting hole 38 that allows water, air, or other materials to escape to the atmosphere outside of lower tube 24.

The threading engagement of operating barrel 34 to operating shaft 44 permits operating barrel 34 to travel along a longitudinal axis of rotating arm tube 24. Operating shaft 44 is operationally engaged to crank assembly 52, preferably at crank knob 54. In order to engage crank assembly 52, operating shaft 44 preferably passes through position indicator tube 46. Position indicator tube 46 incorporates a position indicator 48 that is identified by the user to show a position indicative of the amount of travel of operating barrel 34.

In operation, as additionally discussed below, as the user rotates crank handle 56 of crank knob 54, operating shaft 44 rotationally engages operating barrel 34 at threads 40. This rotational engagement causes operating barrel 34 to move positions along the longitudinal axis of lower tube 24. As operating barrel 34 travels along the longitudinal axis of lower tube 24, position indicator tube 46 moves as well, thereby resulting in a similar movement of position indicator 48. Position indicator 48 is visually identifiable to a user because it protrudes from a position indicator slot 50 that is incorporated into rotating arm tube 24.

In order to provide the desired fit and limit exposure of the components internal to rotating arm tube 24, thrust washers 58 and 62 and thrust anchors 60 and 64 can be used.

Figure 2A:
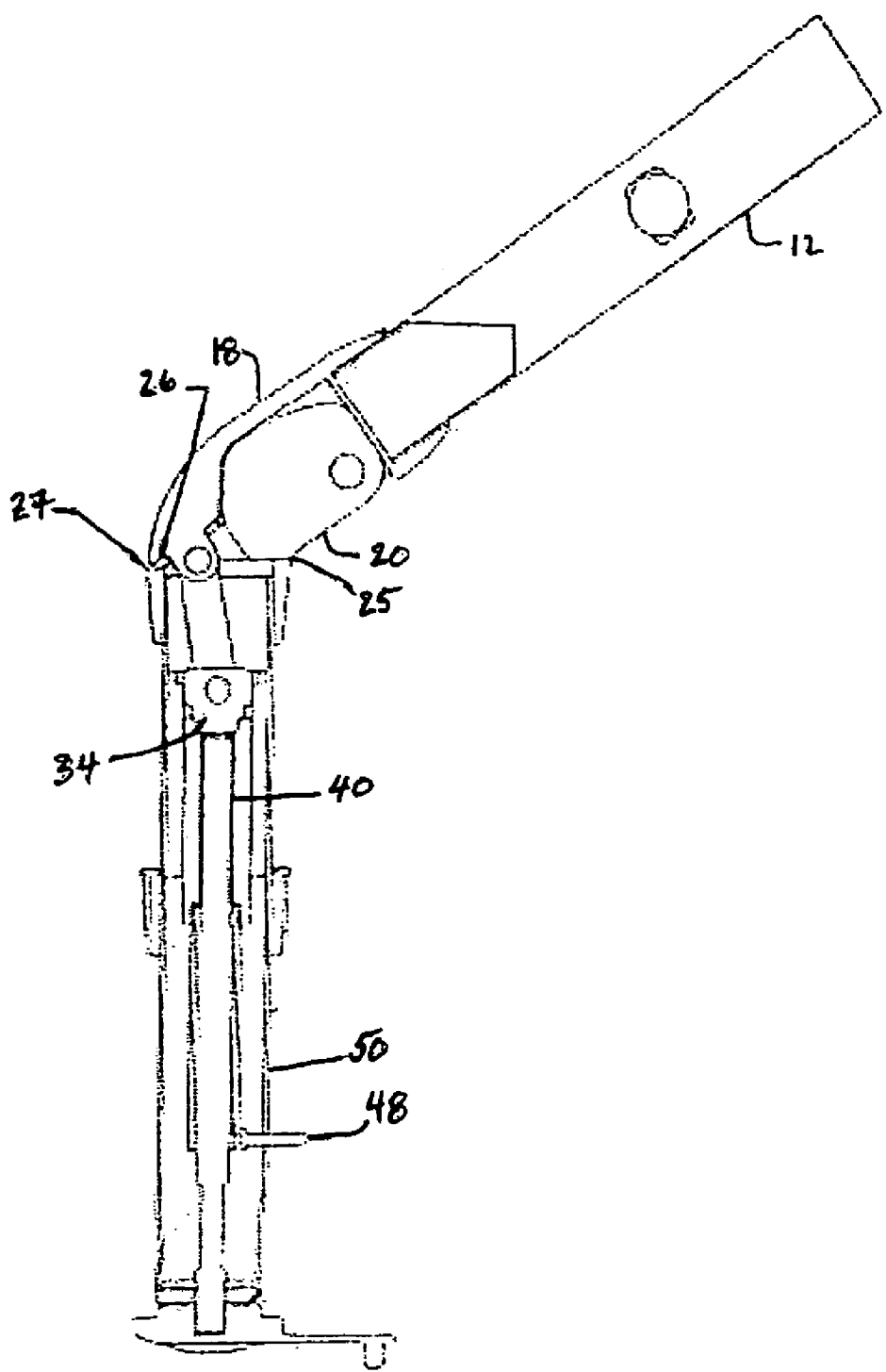
FIG. 2a is a sectioned side view illustration of the present invention of FIG. 1 shown in a first position.
Figure 2B:
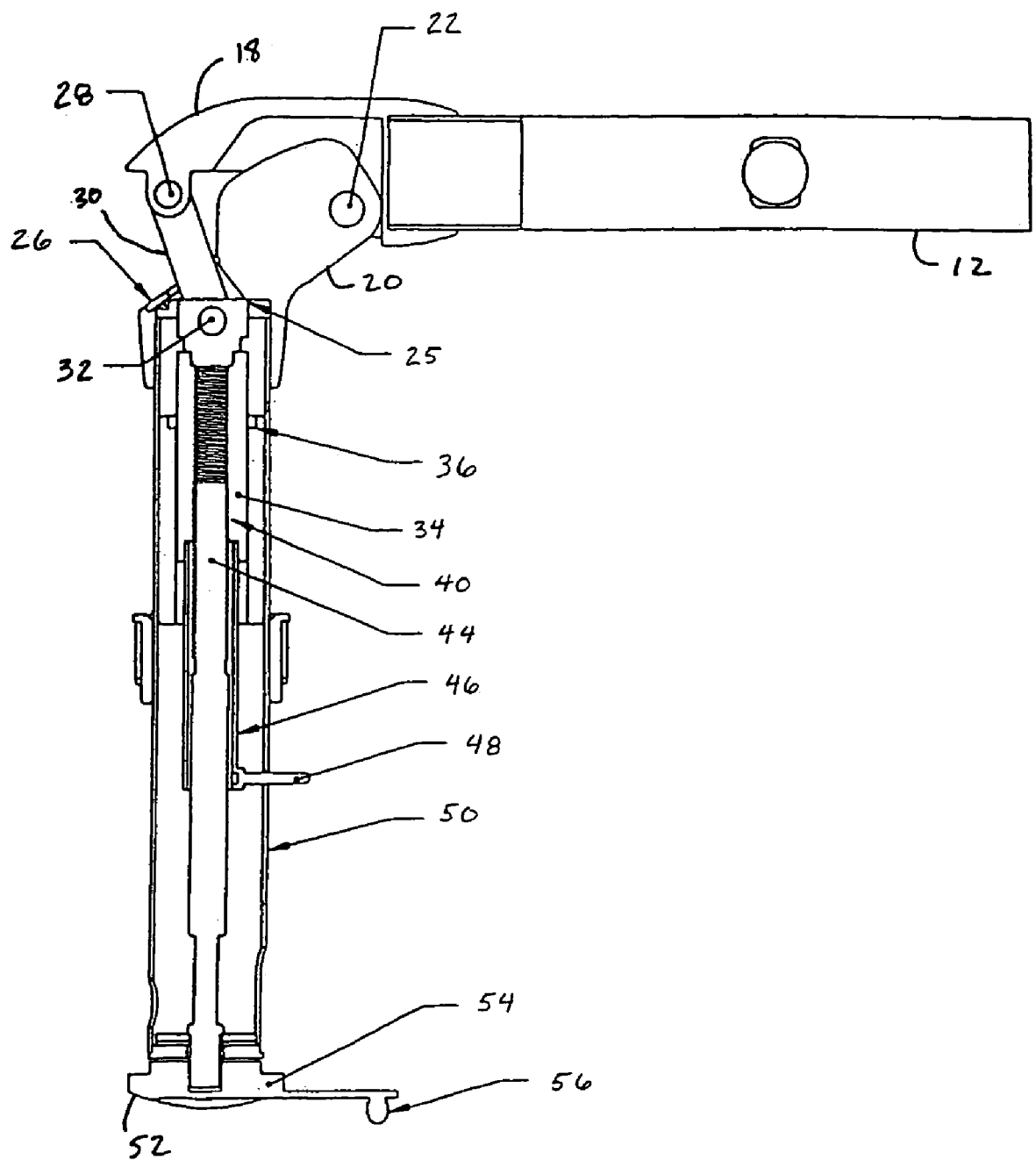
FIG. 2b is a sectioned side view illustration of the present invention of FIG. 2 shown in an second position.

Referring now to FIGS. 2a and 2b, positioning of boom attachment tube 12 of adjustable arm assembly 10 is illustrated. As is shown in FIG. 2a, boom attachment arm 12, upper pivoting head 18, operating barrel 34, and position indicator 48 are in a first position relative to rotating arm tube 24. During operation, a user engages crank handle 56 of crank assembly 52 to rotate crank knob 54 about its engagement point with operating shaft 44. As operating shaft 44 is rotated in a manner consistent with the rotation of crank handle 56 and corresponding crank knob 54, the threading of operating shaft 44 rotationally engages threads 40 of operating barrel 34. The rotational engagement between the threads of operating shaft 44 and operating barrel 34 cause operating barrel 34 to travel within rotating arm tube 24.

The travel of operating barrel 34 within rotating arm tube 24, as illustrated in FIG. 2b, causes a corresponding travel of position indicator tube 46 and position indicator 48. Furthermore, as operating barrel 34 travels towards lower head 20, its travel is halted by barrel stop 25, thus preventing operating barrel 34 from completely exiting lower tube 24 or dislodging from operating shaft 44. While operating barrel 34 is traveling towards barrel stop 25, operating link 30, through its engagement with upper pivoting head 18, causes upper pivoting head 18 to rotate downward at head fulcrum point 22. This motion results in a lowering of boom attachment arm tube 12 and any engaged outrigger boom.

Similarly, if a user engages crank handle 56 of crank assembly 52 to counter-rotate crank knob 54 about its engagement point with operating shaft 44, operating shaft 44 is counter-rotated in a manner consistent with the counter-rotation of crank handle 56 and corresponding crank knob 54, and the threading of operating shaft 44 rotationally engages threads 40 of operating barrel 34 in a like counter-rotational manner. The counter-rotational engagement between the threads of operating shaft 44 and operating barrel 34 causes operating barrel 34 to travel within rotating arm tube 24 in a direction opposite of that of the rotational engagement discussed above. This results in a corresponding opposite travel of position indicator tube 46 and position indicator 48.

Additionally, as operating barrel 34 is traveling away from barrel stop 25, operating link 30, through its engagement with upper pivoting head 18, causes upper pivoting head 18 to rotate upward at head fulcrum point 22. This motion results in a raising of boom attachment arm tube 12 and any engaged outrigger boom.

Figure 3:
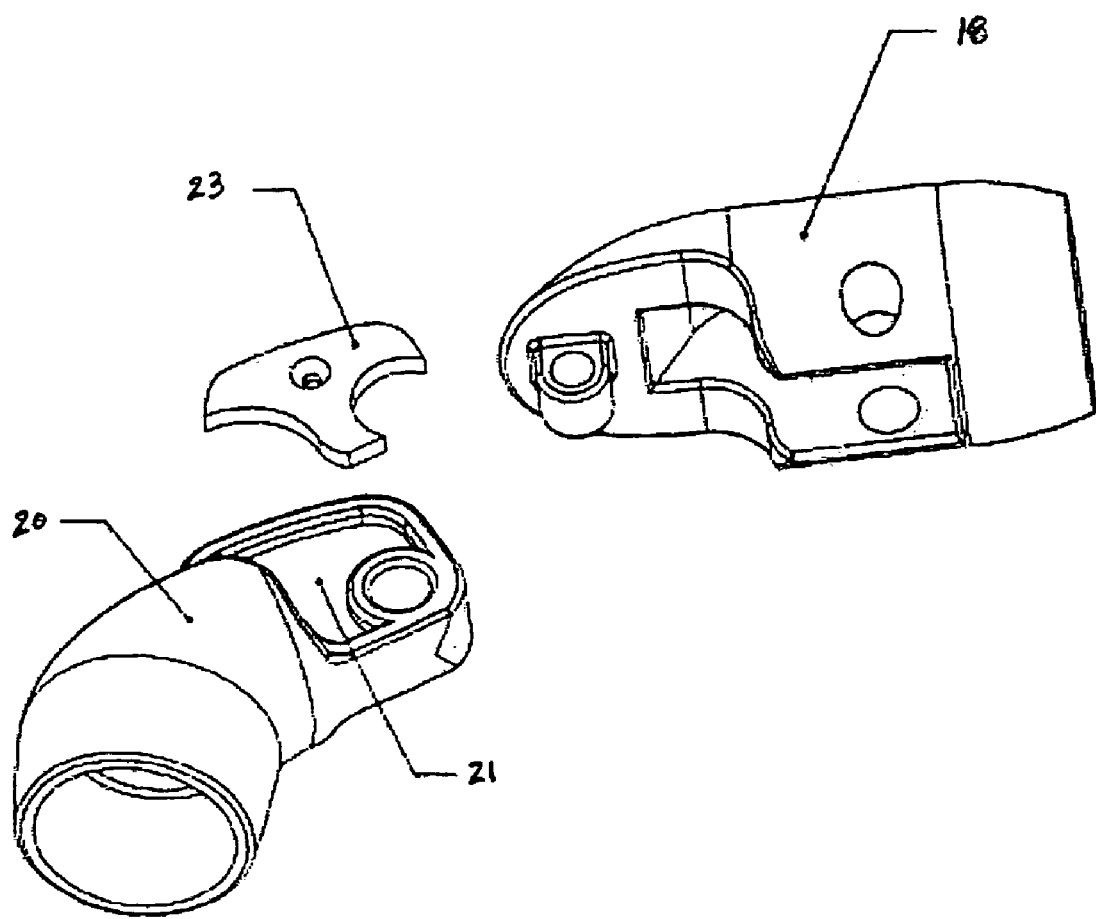
FIG. 3 is an exploded view of the upper and lower heads of FIG. 1 of the present invention.

Referring now to FIG. 3, upper pivoting head 18 is illustrated disengaged from lower head 20, revealing a thrust plate 23 for additional support and a head recess 21 in lower head 20 to accommodate head thrust plate 23.

Figure 4A:
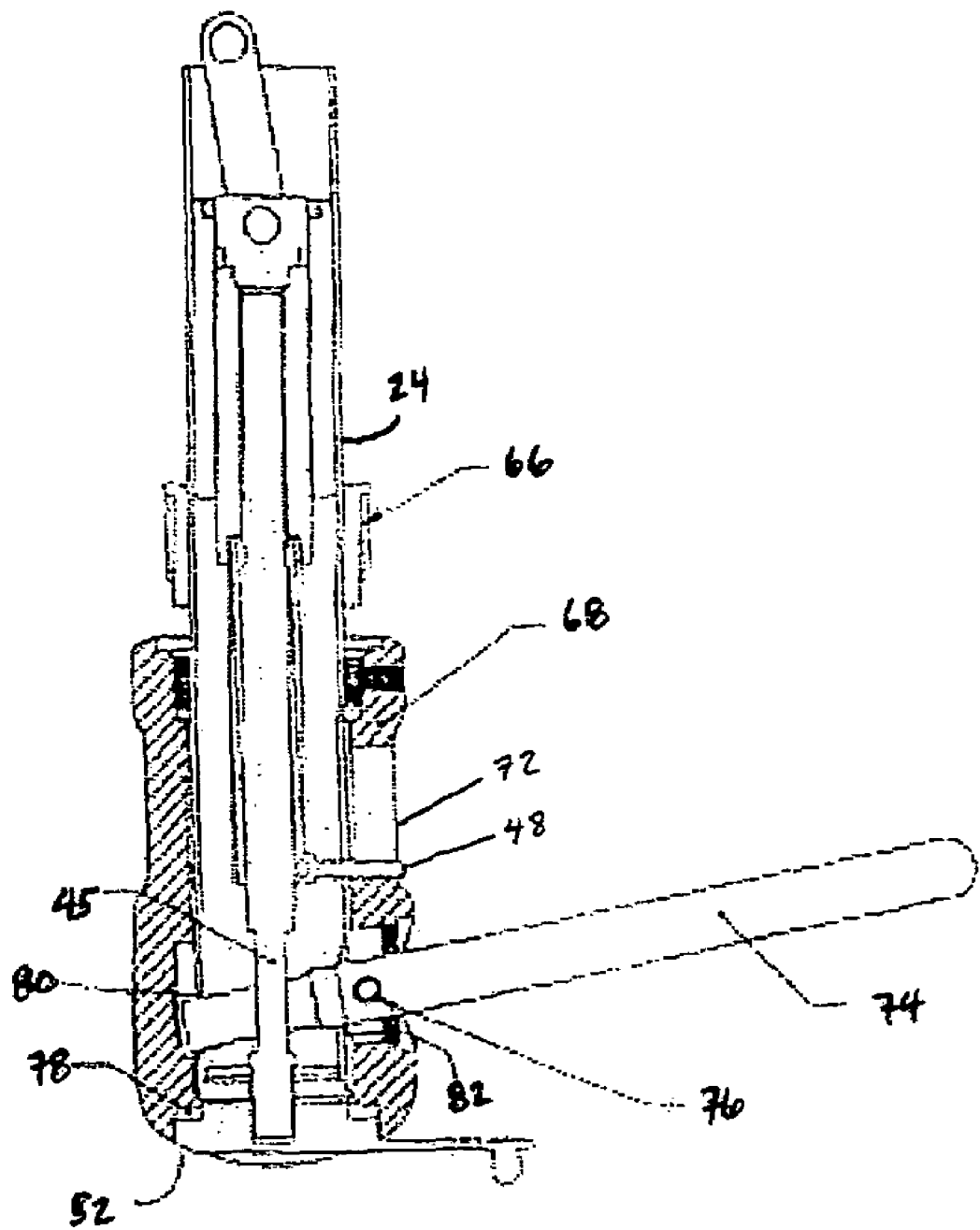
FIG. 4a is a sectioned side view illustration of a partial assembly of FIG. 1 engaged to a rotator of the present invention.
Figure 4B:
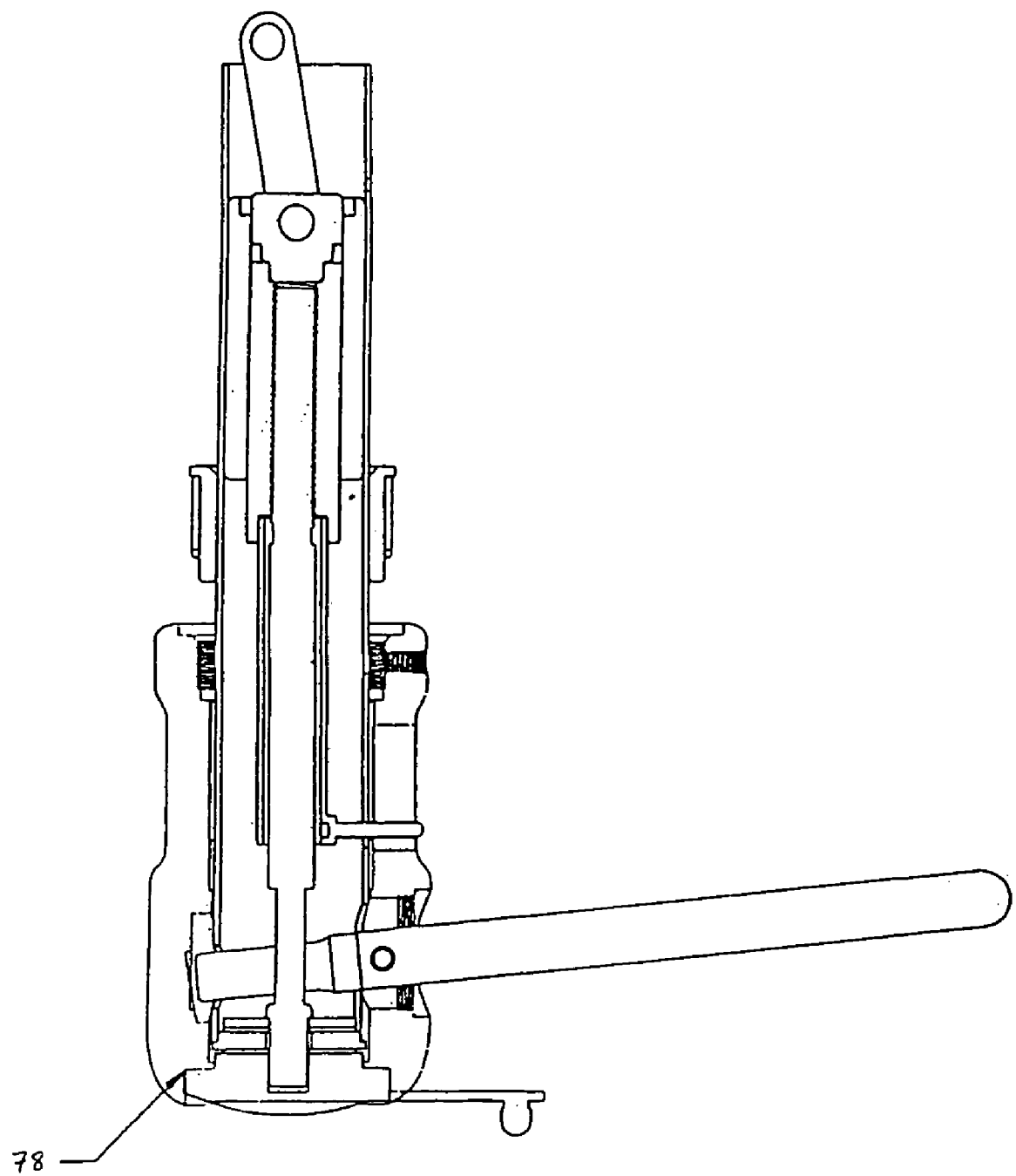
FIG. 4b is a sectioned side view illustration of a partial assembly of FIG. 1 engaged to a rotator of the present invention.
Figure 6:
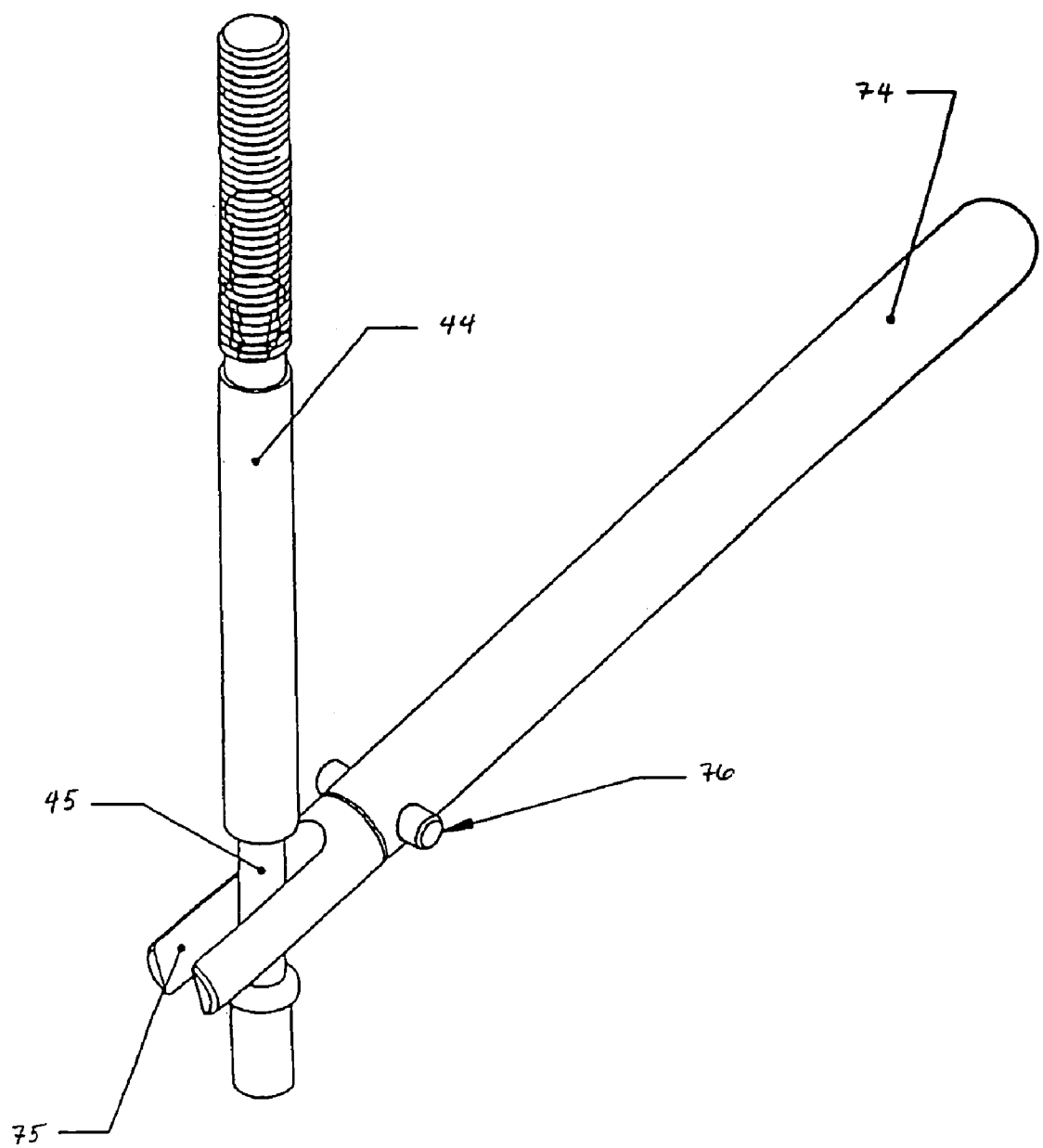
FIG. 6 is an isometric view illustration of the lever and operating shaft assembly of the present invention.

Referring now to FIGS. 4a and 4b, rotating arm tube 24 is illustrated engaged to rotator 68 and lever 74. Rotating arm tube 24 incorporates lever engagement-openings 80 and 82 so as to accommodate lever 74. As is illustrated more clearly in FIG. 6, operating lever 74 includes a forked end 75 that passes around lever relief region 45 of operating shaft 44. The engagement between rotator 68 and rotating arm tube 24 further engages crank assembly 52.

The engagement between rotator 68 and crank assembly 52 is provided with operating clearance 78, thus when position indicator 48 is at a point nearest to crank assembly 52 there is enough space to provide clearance to permit rotating arm tube 24 and crank assembly 52 to move along with movements of lever 74 about lever fulcrum point 76.

Rotator 68 incorporates a rotating body indicator slot 72 that permits position indicator 48 passing through position indicator tube slot 50 of rotating arm tube 24 to pass there through. Additionally, as discussed below, rotating arm tube 24 incorporates an indexing sleeve 66.

Figure 5A:
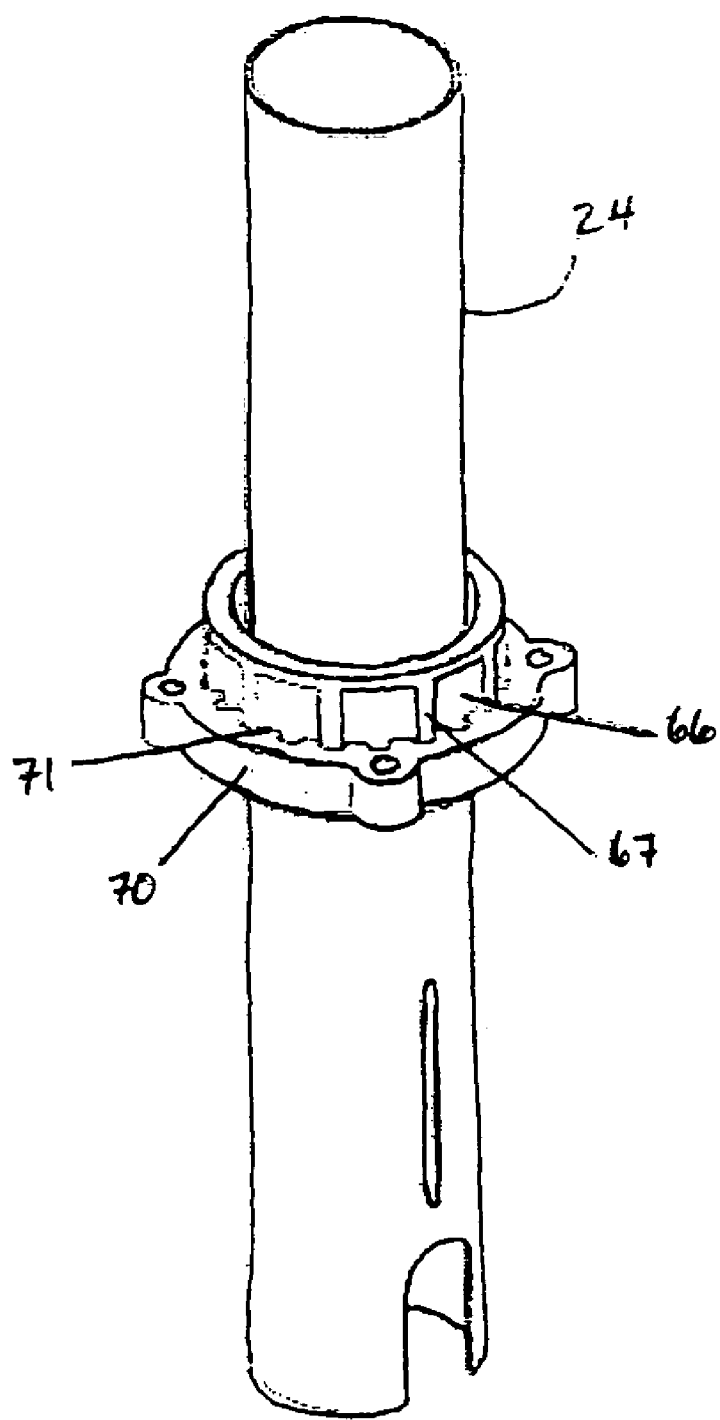
FIG. 5a is an isometric view illustration of the engagement of the indexing sleeve and locking ring.
Figure 5B:
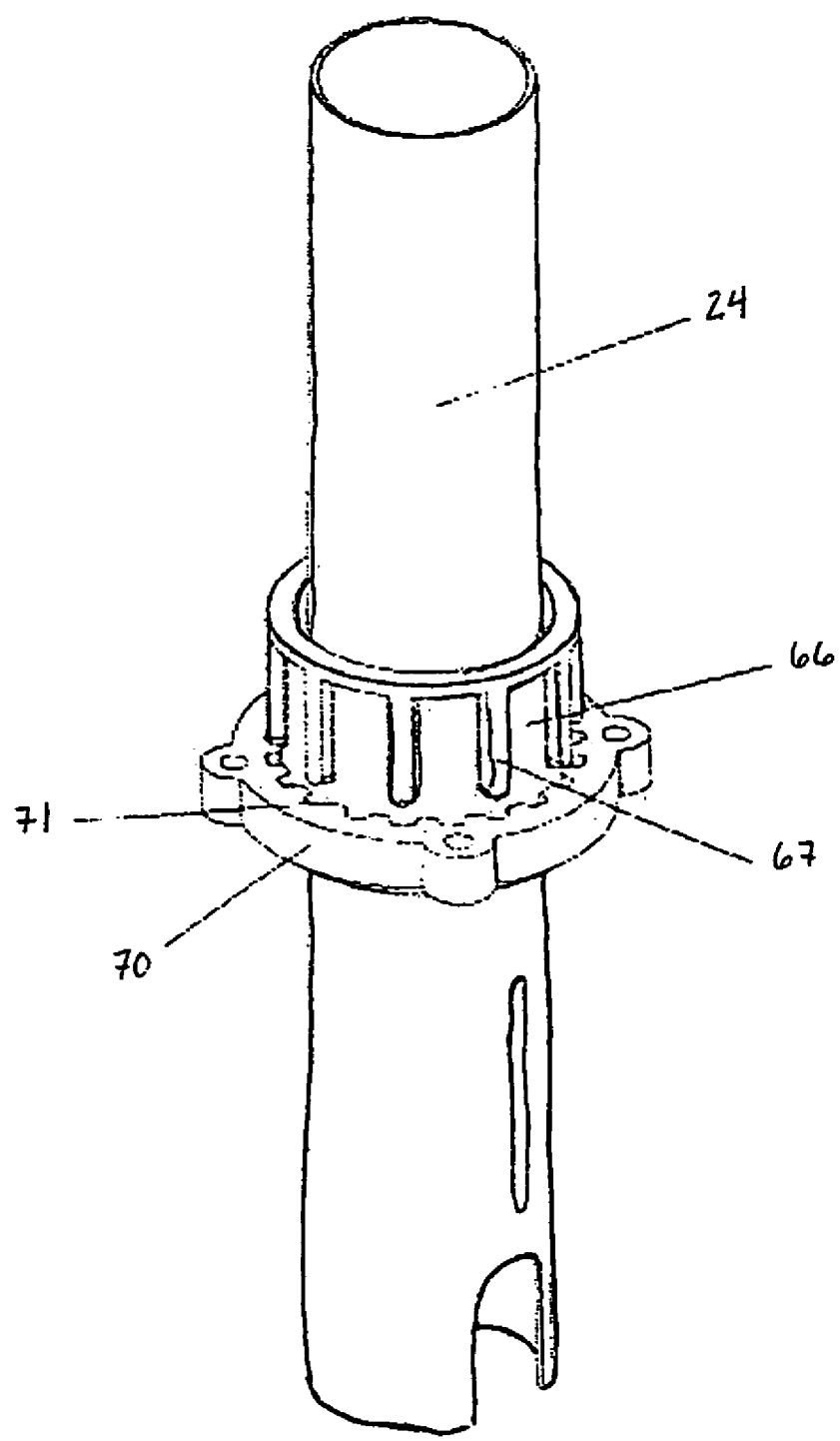
FIG. 5b is an isometric view illustration of the disengagement of the indexing sleeve and locking ring.

Referring now to FIGS. 5a and 5b, indexing sleeve 66 and locking ring 70 are illustrated. FIG. 5a illustrates the secured arrangement of indexing sleeve 66 and locking ring 70. When secured, interfacing ridges 67 of indexing sleeve 66 engage teeth 71 of locking ring 66. This engagement allows for lever 74 (not shown) to lift operatively engaged rotating arm tube 24 its longitudinal axis in a vertical plane. By way of example, when lever 74 is pushed down in a vertical plane, operatively engaged rotating arm tube 24 is raised (i.e., moved in a first direction). This raising action causes interfacing ridges 67 of indexing sleeve 66 to disengage teeth 71 of locking ring 70 (which is connected to rotator 68). This disengagement allows for the user to employ lever 74 to cause to rotate (i.e. move in a second direction) operatively engaged rotator 68 and rotating arm tube 24 up to at least 360° about the longitudinal axis of rotating arm tube 24. The rotation of rotator 68 and rotating arm tube 24 can be beyond 360°, including but not limited to 720°, 1080°, and the like. Thus, lever 74 can be rotationally engaged in a horizontal plane to rotate operatively engaged rotator 68 and rotating tube arm 24 in a plane parallel to the plane of lever 74's rotational movement. When the desired horizontal position is obtained, lever 74 is disengaged from the vertical position, thereby allowing interfacing ridges 67 of indexing sleeve 66 to slide into a new position within teeth 71 of locking ring 70.

Figure 7:
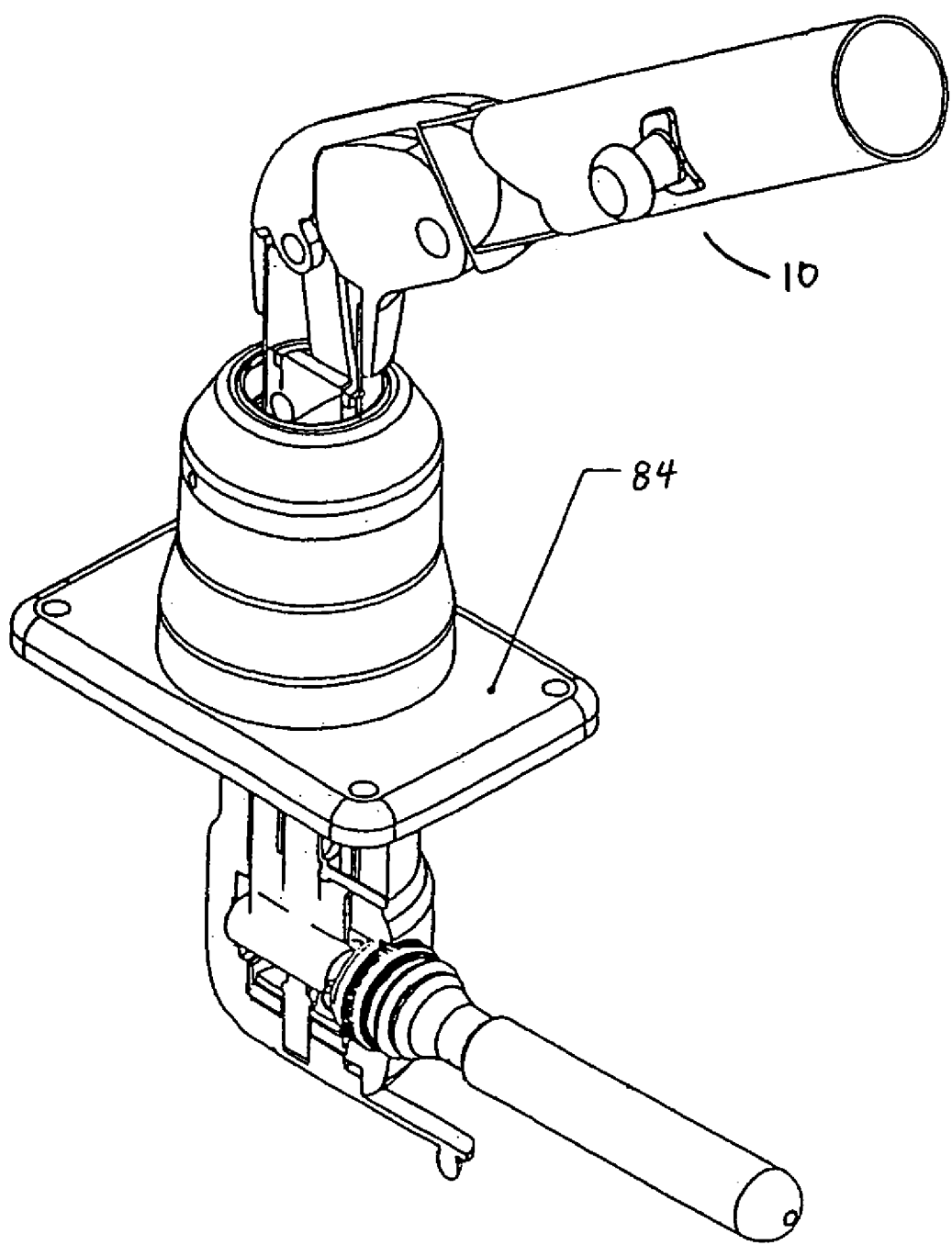
FIG. 7 is a partially sectioned isometric view of the preferred embodiment of the present invention.
Figure 10:
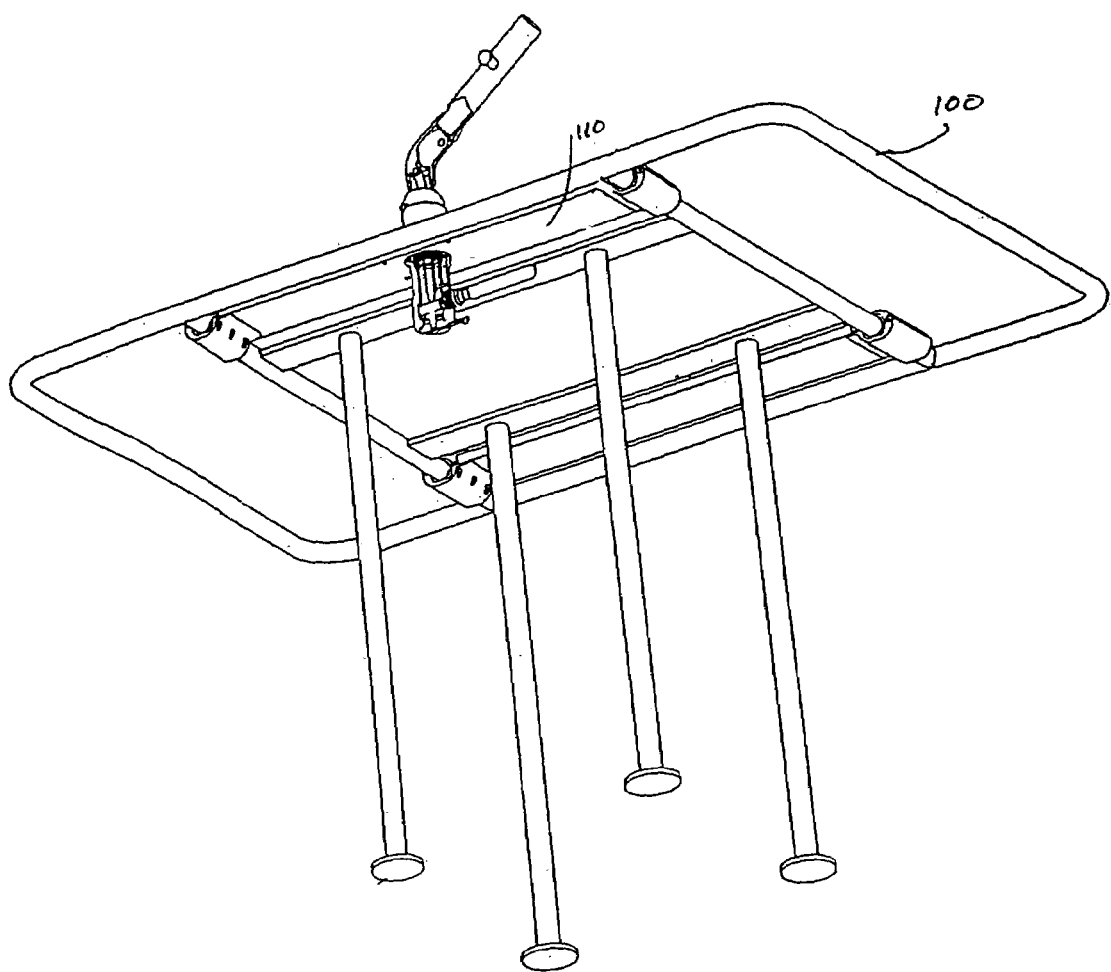
FIG. 10 is a isometric underside view illustration of the preferred embodiment of the present invention mounted to a structure.

Referring now to FIG. 7, the preferred embodiment of the present invention is illustrated as adjustable arm assembly 10 secured to arm mounting unit 84. As is further shown in FIG. 10, arm mounting unit 84 can be secured to a mounting surface 110 of a tower frame 100, or similar structure.

Figure 8A:
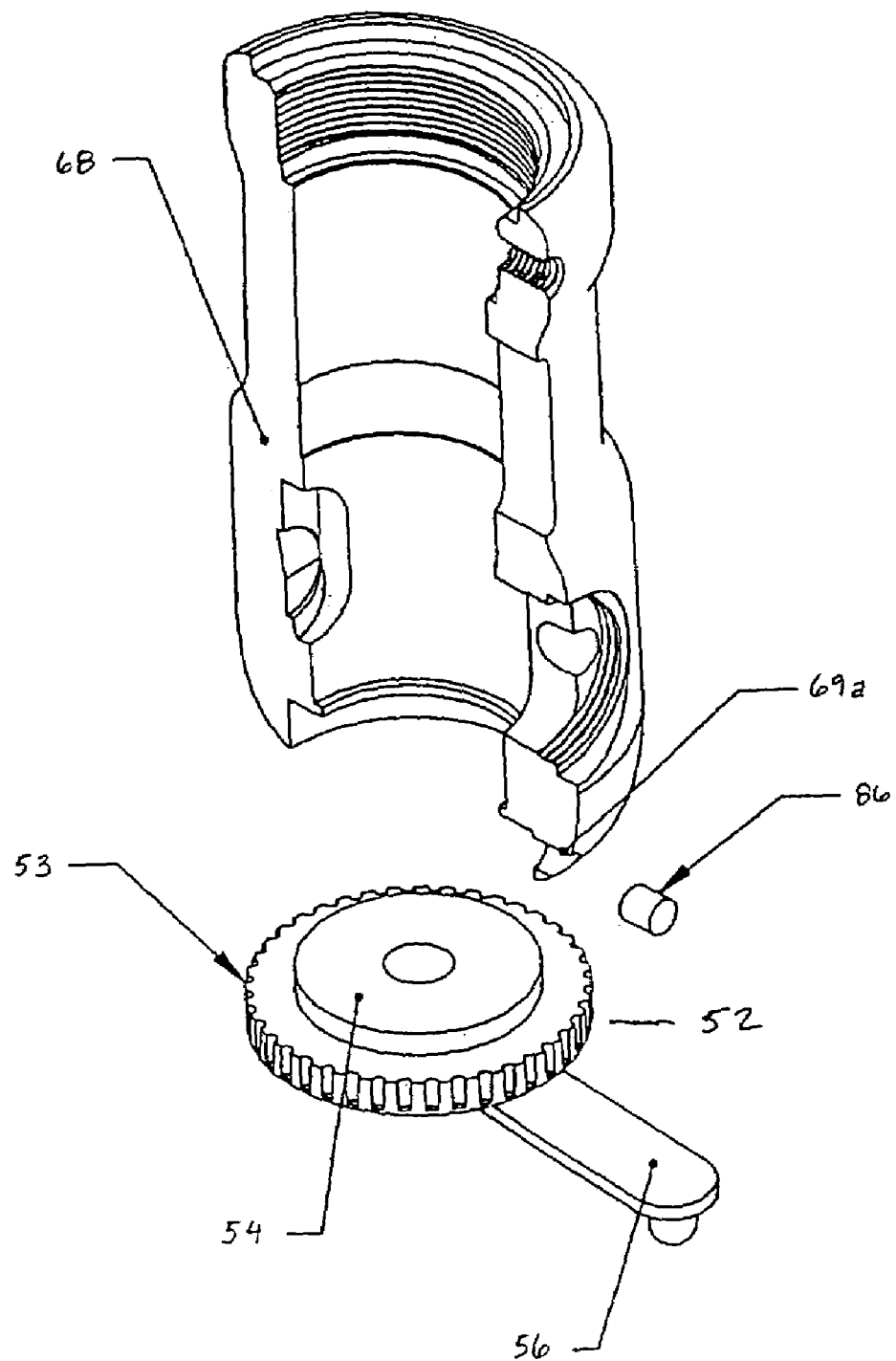
FIG. 8a is an exploded, partially sectioned isometric view of a rotator and crank assembly of the present invention.
Figure 8B:
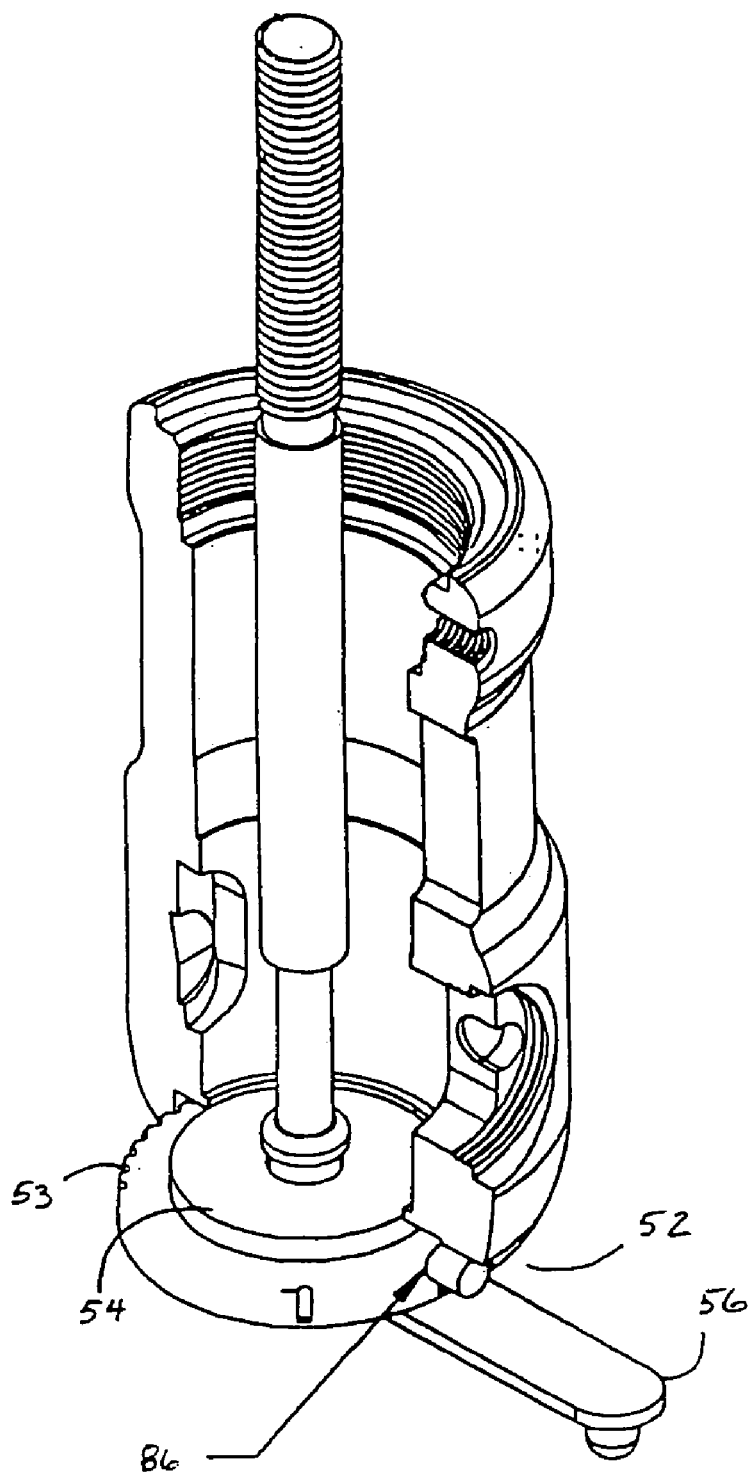

Referring now to FIGS. 8a and 8b, one embodiment of crank assembly 52 is shown in combination with an embodiment of rotator 68. As is shown, crank knob 54 of crank assembly 52 can include a plurality of detent teeth 53 capable of receiving a position detent 86 through detent bore 69a of rotator 68. The engagement of position detent 86 with detent teeth 53 is used to reduce the possibility of unintended movement of crank assembly 52, as is well known in the art.

Figure 9A:
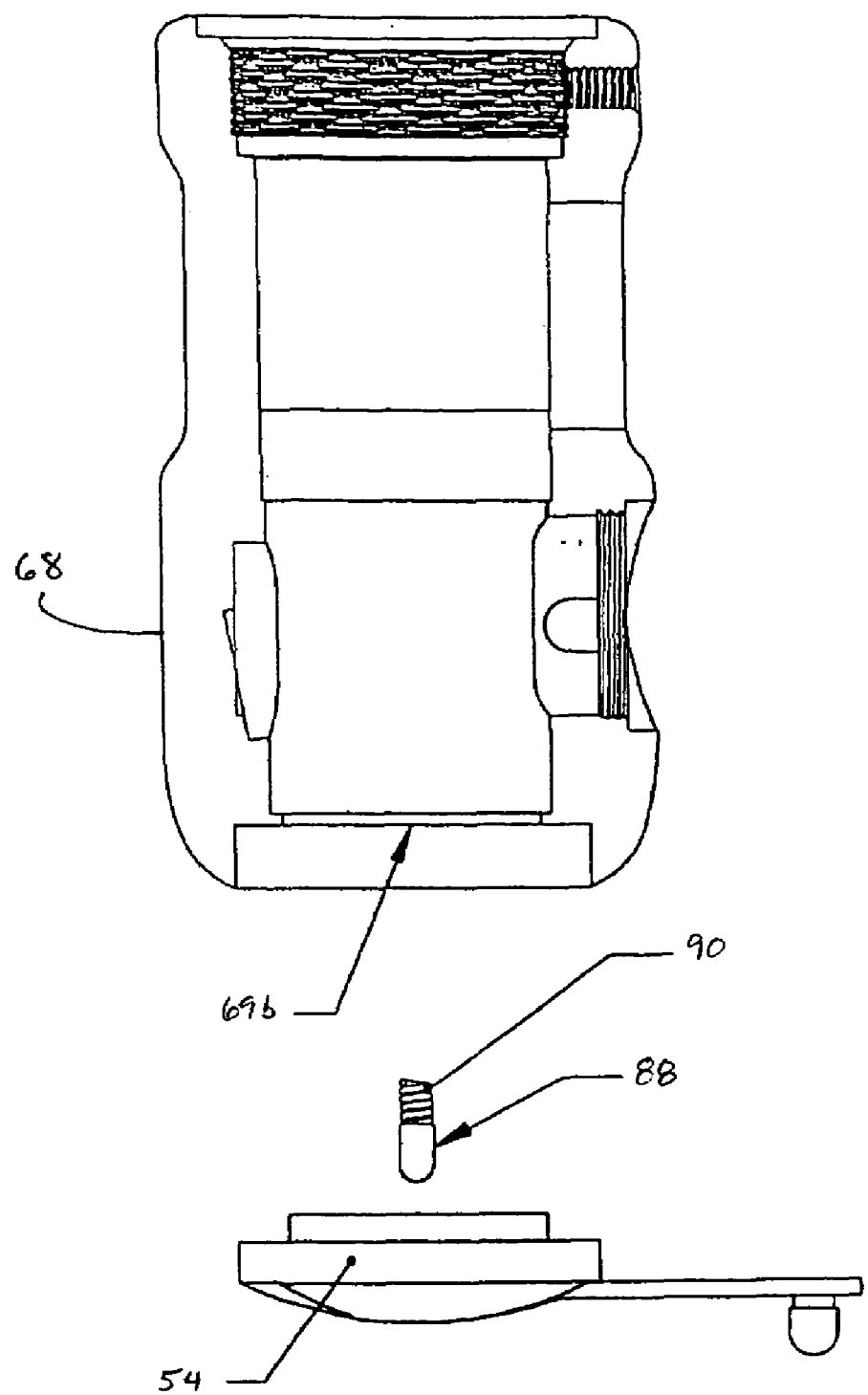
FIG. 9a is an exploded, partially sectioned side view of an alternative embodiment of the rotator and crank assembly of the present invention.
Figure 9B:
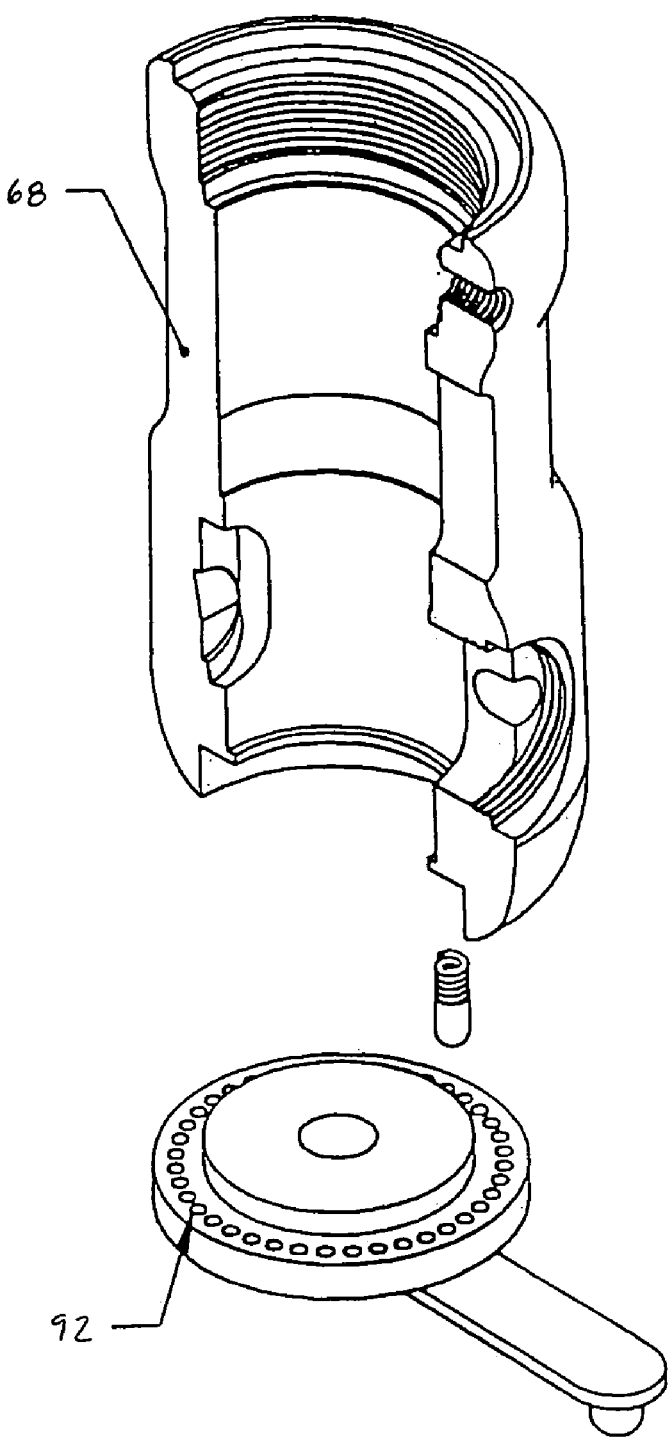

Referring now to FIGS. 9a and 9b an alternative embodiment of crank assembly 52 is shown in combination with an alternative embodiment of rotator 68. As is shown, crank knob 54 of crank assembly 52 can include a plurality of bullet detents 92 capable of receiving a detent spring bullet 88 residing in detent bore 69b of rotator 68. Detent spring bullet 88 abuts a detent ball spring 90, which is positioned within detent bore 69b so as to apply pressure on detent spring bullet 88 when detent spring bullet 88 is not engaged with a bullet detent 90. The engagement of detent spring bullet 88 with bullet detent 90 is also used to reduce the possibility of unintended movement of crank assembly 52, as is well known in the art.

Figure 11:
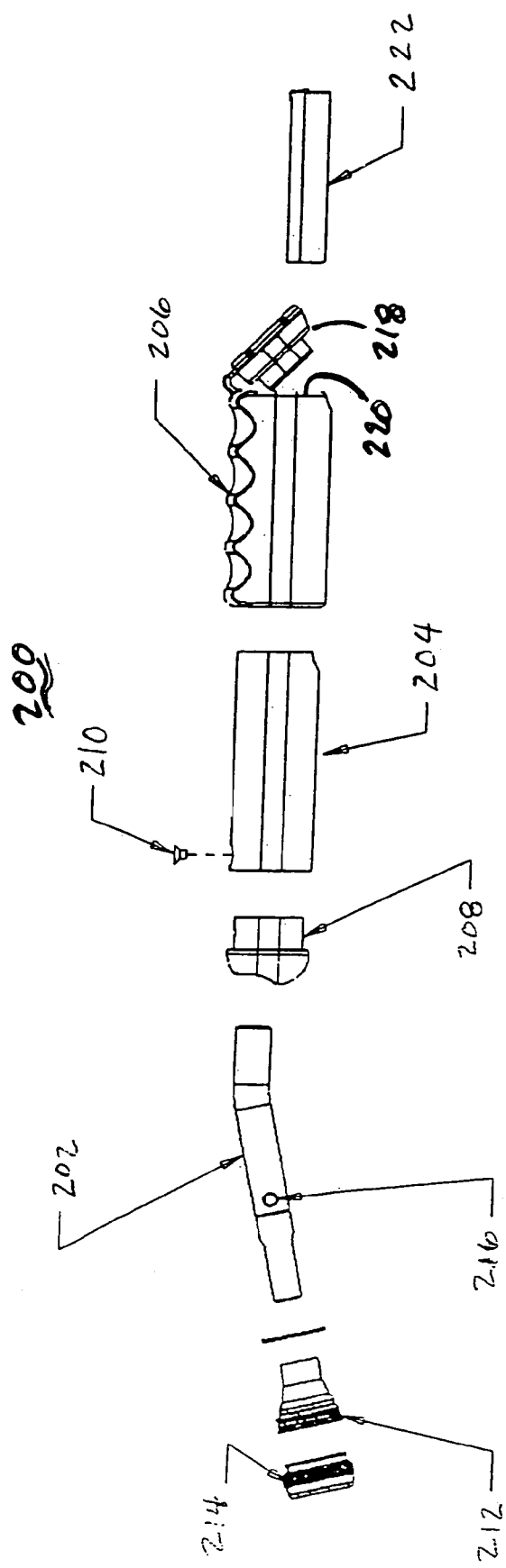
FIG. 11 is an exploded side view illustration of an alternative lever assembly of the present invention.
Figure 12:
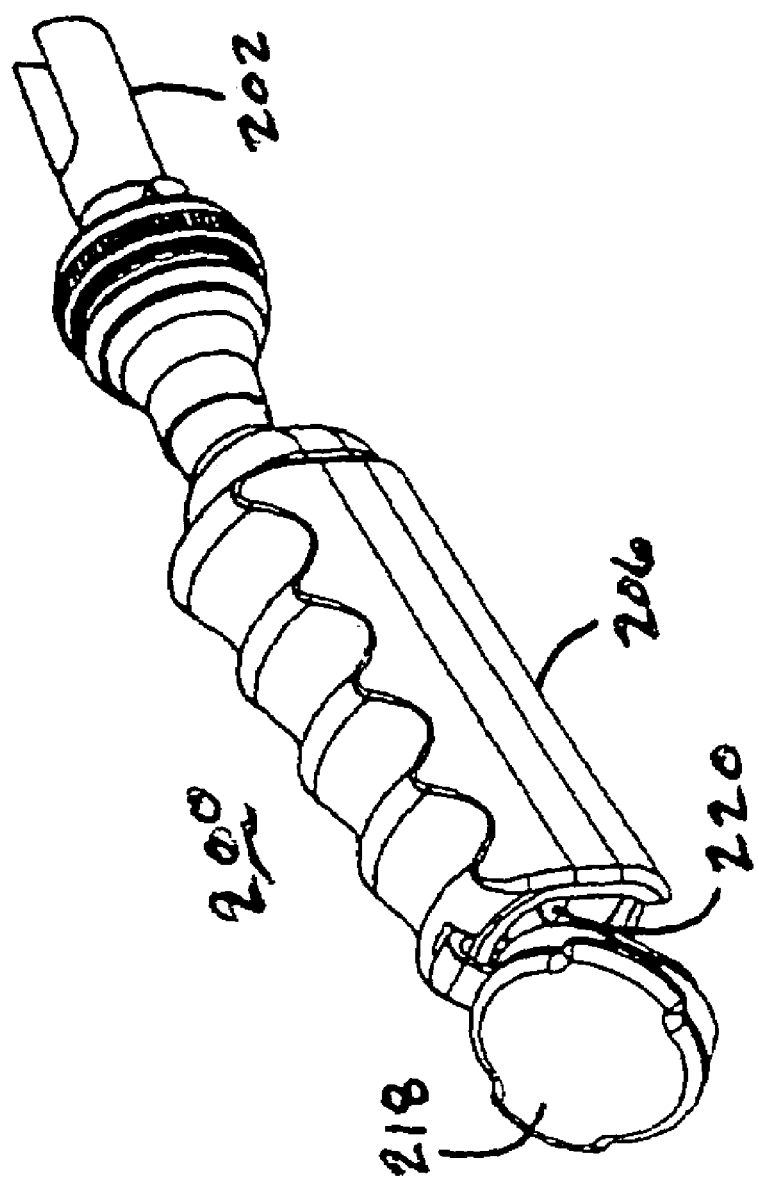
FIG. 12 is an isometric view of the lever assembly of FIG. 11.

Referring now to FIGS. 11 and 12, an alternative lever is illustrated as operating lever assembly 200. Operating lever assembly 200 includes tuning fork lever 202, handle extrusion 204, and grip 206. Tuning fork lever 202 operatively engages handle extrusion 204 by way of handle adapter 208. Handle adapter 208 is secured to handle extrusion 204 through an extension screw 210. Handle adapter 208 can further engage bellows 212 and adapter 214, with adapter 214 positioned adjacent to dowel pin 216. Adapter 214 is utilized to be positioned in lever engagement opening 82 (shown in FIG. 16).

Handle extrusion 204 frictionally receives grip 206. Grip 206 incorporates a flip top 218, the flip top 218 for releasably closing storage cavity 220. Storage cavity 220 accommodates an inner handle molding 222, which can incorporate a stepped end 224.

Figure 13:
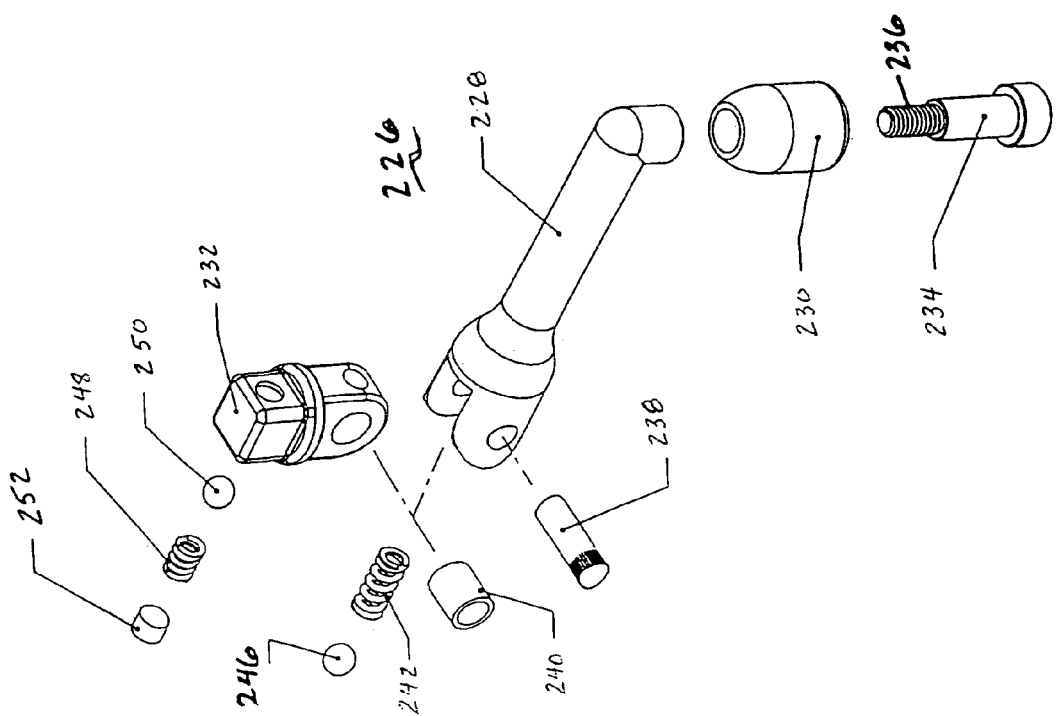
FIG. 13 is an exploded isometric view illustration of an alternative crank assembly of the present invention.
Figure 14:
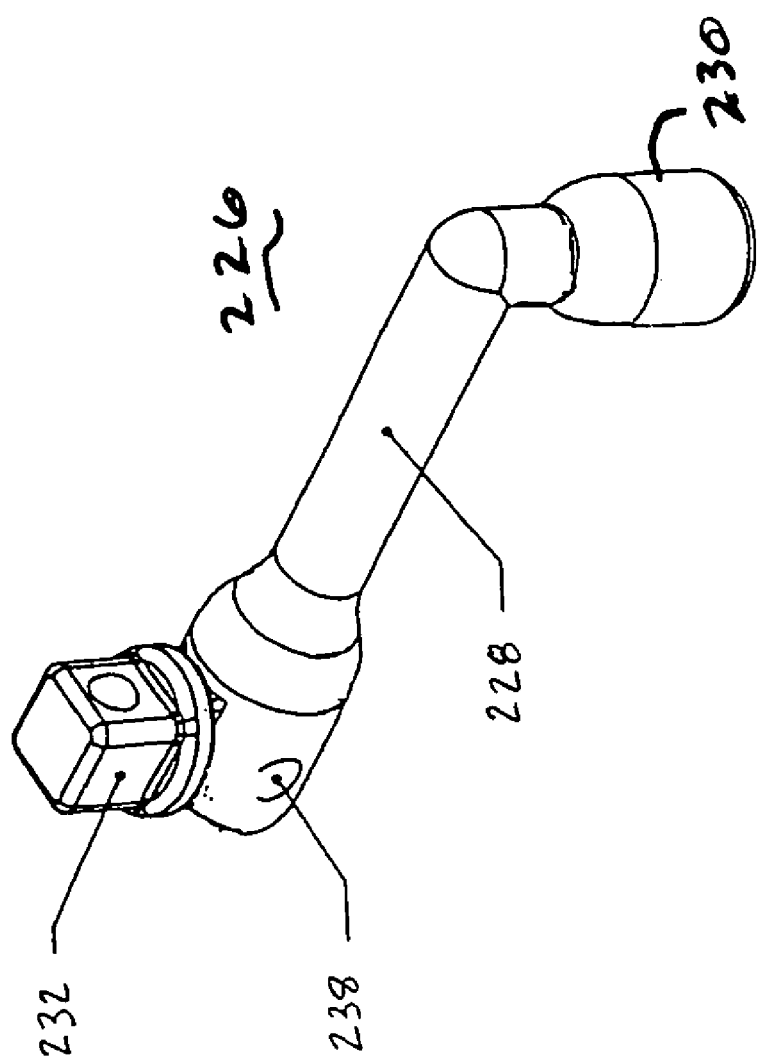
FIG. 14 is an isometric view illustration of the crank assembly of FIG. 11.

Storage cavity 220 is preferably employed to hold a selectively releasable crank assembly 226, illustrated in FIGS. 13 and 14. Referring now to FIGS. 13 and 14, selectively releasable crank assembly 226 includes a crank handle 228, a hand knob 230, and a swivel end unit 232. Crank handle 228 operatively engages hand knob 230 by way of shoulder bolt 234. Shoulder bolt 234 includes threaded portion 236, which operatively engages crank handle 228 so that hand knob 230 abuts crank handle 228.

Crank handle 228 additionally engages swivel end unit 232 with a crank pin 238. Crank pin 238 can pass through a bushing 240 positioned in swivel end unit 232, so as to reduce friction. Crank handle 228 can further include a crank handle spring 242 supporting a detent ball 246, thereby permitting crank handle 228 to be movable with respect to swivel end unit 232. Swivel end unit 232 further incorporates a swivel end spring 248 supporting a detent ball 250 and abutting a swivel end plug 252. Swivel end plug 252 provides a base for spring 248 to compress against in response to a compression force applied to detent ball 250, as described below.

Figure 15B:
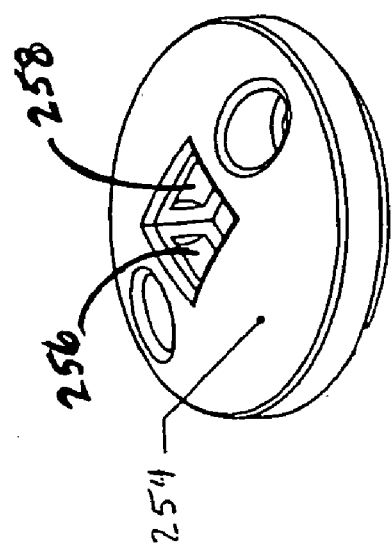
FIG. 15b is an isometric bottom view of the end cap of FIG. 15B.
Figure 15A:
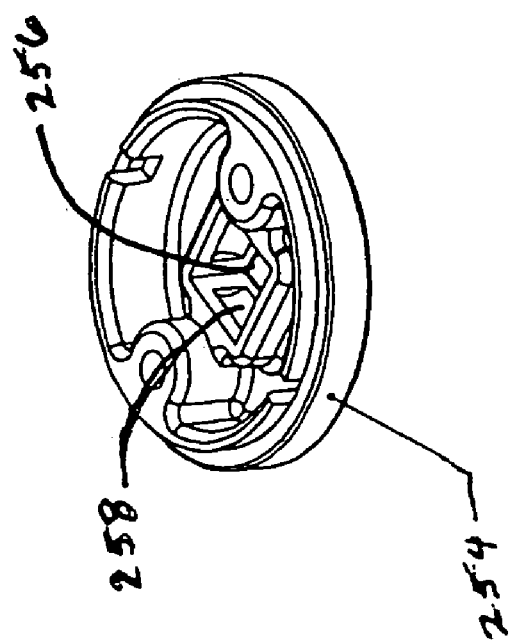
FIG. 15a is an isometric top view of an alternative end cap of the present invention.

Referring now to FIGS. 15a and 15b, swivel end unit 232 is received by end cap 254. End cap 254 has a swivel end unit receptor 256. Swivel end unit receptor 256 incorporates detents 258 that accommodate detent ball 250.

Figure 16:
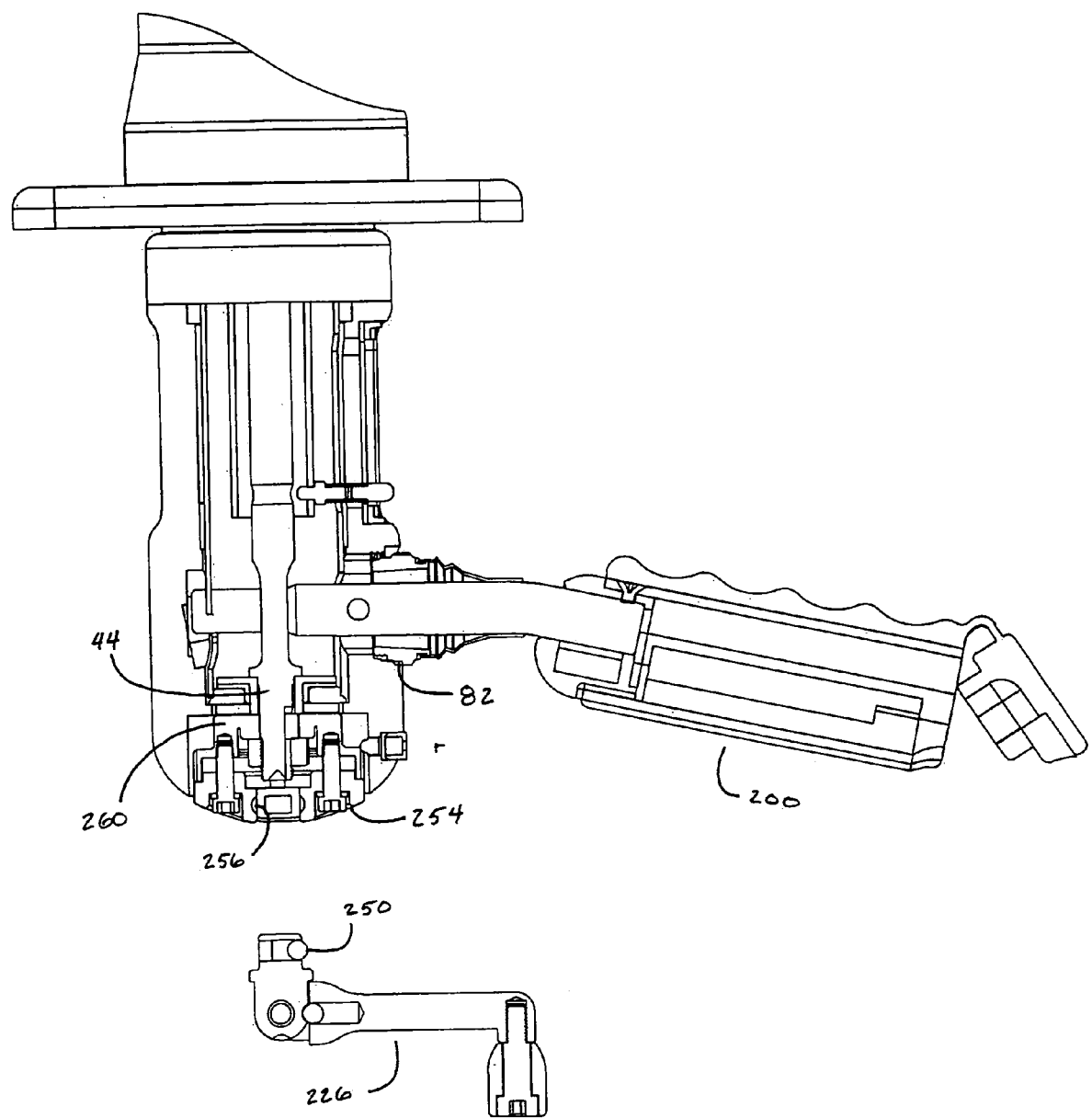
FIG. 16 is a sectioned side view of the alternative lever assembly and crank assembly of the present invention.

As shown in FIG. 16, in operation selectively releasable crank assembly 226 engages swivel end unit receptor 256 with detent ball 250 positioned in a detent 258. Swivel end unit 232 operationally engages operating shaft 44, so that when crank handle 228 is rotated by the user operating shaft 44 is also rotated. As crank handle 228 is rotated, swivel end unit 232 rotates, further rotating end cap 254. Rotating end cap 254 rotates engaged end cap receiver 260, which rotates operating shaft 44, resulting in motion of upper pivoting head 18 as detailed above.

Although only a few exemplary embodiments of the present invention have been described in detail above, those skilled in the art will readily appreciate that numerous modifications to the exemplary embodiments are possible without materially departing from the novel teachings and advantages of this invention. Accordingly, all such modifications are intended to be included within the scope of this invention as defined in the following numbered claims.

What is claimed is:

1. An adjustable arm assembly for use with an outrigger, comprising:
    a rotating arm tube secured to a lower head;
    an upper pivoting head operatively engaged to said lower head, said upper pivoting head operatively engaged to an operating barrel by an operating link connected to said upper pivoting head, and said operating barrel having at least one link fulcrum point;
    a crank assembly operatively engaged to said operating barrel and said rotating arm tube.

2. An adjustable arm assembly for use with an outrigger, comprising:
    a rotating arm tube secured to a lower head;
    an upper pivoting head operatively engaged to said lower head and to an operating barrel;
    a crank assembly operatively engaged to said operating barrel and said rotating arm tube;
    a threaded operating shaft in rotational engagement with said crank assembly, said threaded operating shaft engaging adjustment threads of said operating barrel; and
    a position indicator tube having a position indicator connected to said operating barrel.

3. The adjustable arm assembly according to claim 2 wherein said rotating arm tube incorporates a position indicator tube slot.

4. The adjustable arm assembly according to claim 3 wherein said position indicator passes through at least a portion of said position indicator tube slot.

5. The adjustable arm assembly according to claim 2 wherein said rotating arm tube is engaged to a rotator.

6. The adjustable arm assembly according to claim 5 wherein said rotating arm tube and said rotator accommodate a lever.

7. The adjustable arm assembly according to claim 6 wherein said lever is capable of moving said rotator arm tube in a first direction.

8. The adjustable arm assembly according to claim 7 wherein said lever is capable of moving said rotator in a second direction.

9. The adjustable arm assembly according to claim 6 wherein said rotating arm tube incorporates an indexing sleeve.

10. The adjustable arm assembly according to claim 2 wherein said crank assembly includes a crank knob and a crank handle.

11. The adjustable arm assembly according to claim 10 wherein said crank knob incorporates a plurality of detent teeth.

12. The adjustable arm assembly according to claim 11 wherein said crank knob incorporates a plurality of detent teeth accommodates a detent.

13. The adjustable arm assembly according to claim 10 wherein said crank knob incorporates a plurality of bullet detents.

14. The adjustable arm assembly according to claim 13 wherein said plurality of bullet detents accommodates at least one detent spring bullet.

15. A method for adjusting an arm assembly, comprising:
    rotating a crank handle of a crank assembly positioned below a position indicator to arrange a boom attachment arm tube in a first position relative to said crank handle;
    engaging a lever to permit rotation of said boom attachment arm into a second position;
    rotating said boom attachment arm into said second position; and
    disengaging said lever to restrict rotation of said boom attachment arm out of said second position.

* * * * *